(12) United States Patent
Colorado

(10) Patent No.: US 7,523,847 B2
(45) Date of Patent: Apr. 28, 2009

(54) ENDOTHERMIC CONNECTOR FOR COPPER WELDING

(75) Inventor: Carlos Enrique Colorado, Pereira (CO)

(73) Assignee: John J. Martinez, Croton On Hudson, NY (US)

( * ) Notice: Subject to any disclaimer, the term of this patent is extended or adjusted under 35 U.S.C. 154(b) by 454 days.

(21) Appl. No.: 11/490,464

(22) Filed: Jul. 20, 2006

(65) Prior Publication Data
US 2007/0295782 A1 Dec. 27, 2007

(51) Int. Cl.
*B23K 20/08* (2006.01)
(52) U.S. Cl. .......................... 228/2.5; 228/107
(58) Field of Classification Search .................. 228/2.5, 228/107–109, 234.3, 41; 266/167; 164/53, 164/54; 249/86, 95
See application file for complete search history.

(56) References Cited

U.S. PATENT DOCUMENTS 2,870,499 A * 1/1959 Burke .......................... 164/54
6,661,331 B2 * 12/2003 Valembois et al. .......... 337/401

* cited by examiner

*Primary Examiner*—Kevin P Kerns
*Assistant Examiner*—Megha Mehta
(74) *Attorney, Agent, or Firm*—Martinez Patents PC; John J. Martinez

(57) ABSTRACT

The present invention provides a device to weld metallic elements. The device is an endothermic connector that comprises a chassis that is assembled by joining two equal halves around the end of a metallic rod with an assembling nut and a pressure nut. The chassis also accommodates a metallic cable, on contact with the metallic rod's end, with an external adapter that adjusts to the chassis with a third nut. The third nut, in the cavity defined by its internal diameter, houses the inferior part of a portable unit that contains a detonator and a mixture of an explosive powder with electrolytic metal particles. The ignition of the explosive powder increases the temperature, melting the metal particles, which in liquid state, migrate to the chassis' intermediate portion, wherein, as they solidify, weld the rod's end with the cable.

14 Claims, 8 Drawing Sheets

ENDOTHERMIC CONNECTOR FOR COPPER WELDING

BACKGROUND OF THE INVENTION

1. Field of the Invention

The present invention is related to the art of welding two or more metallic elements, as for example, ground rods and copper cables, such that the weld is corrosion resistant, without increasing electric resistance.

2. Description of Prior Art

In the prior art two or more metallic elements, ground rods, cables, etc., have been welded using methods that require re-usable molds with a chamber to accommodate metallic elements, and another chamber to house the metallic particles to weld the metallic elements. Specifically, In the U.S. Pat. No. 6,994,244 (Feb. 7, 2006), Harper et al. describes a mold with two chambers, one chamber to accommodate metallic elements and the second chamber to house copper particles to weld the metallic elements.

The present invention does not require using re-usable molds with two chambers.

The inventor of the present invention, in Colombian Patent Application No. 447000 (May 20, 2004), describes an endothermic connector device to join a cable and a copper rod which includes a adjustment screw, an anti-expansion ring, an adapter element for the cable, a coupling chassis to cover the rod, and a nut that adjust the connector to the copper rod.

One of the limitations of the described connector in the Patent Application No. 447000, is that the chassis can not be used with copper rods with lips at the superior end. Lips that have been formed when burying copper rods by the traditional method of hammer strikes.

The present invention does not require an anti-expansion ring or screws. In addition, the present invention provides an appropriate chassis for copper rods with lips formed at the end where it has been hit with a hammer.

BRIEF DESCRIPTION OF THE INVENTION

The present invention provides an endothermic connector device to weld metal elements, wherein said device is characterized by:

A. Two identical halves which are joined to form a chassis, wherein the chassis has an inferior portion, an intermediate portion and a superior portion; and wherein the inferior portion has an inferior part and a superior part; and wherein the intermediate portion has an intermediate inferior part and an intermediate superior part;

B. An assembling nut that fits externally the chassis' inferior portion, at the level of the superior part of the inferior portion; and wherein the assembling nut keeps joined the chassis' two identical halves;

C. A pressure nut that fits the chassis' inferior portion, at the level of the inferior part of the inferior portion; and wherein the pressure nut tightens firmly the chassis over the body of a metal rod;

D. An external cylindrical adapter that fits externally around the intermediate superior part of the chassis' intermediate portion;

E. A nut that fits the chassis' superior portion;

F. A portable unit.

In another version of the present invention, the two nuts, the assembling nut and the pressure nut, can be substituted by a single nut with the two functions.

However, a single nut for both functions has the limitation that it can not be tighten until the metallic rod is a final position with respect to the metallic cable.

The chassis of the present invention is preferably an assembly of two identical halves; wherein the chassis has an inferior portion, an intermediate portion, and a superior portion; and wherein the inferior portion has external thread; and wherein the inferior portion has an inferior part and a superior part; and wherein the intermediate portion has an intermediate inferior part and an intermediate superior part; wherein the inferior portion forms a cylindrical cavity which diameter fits perfectly the diameter of the cylindrical body of a metal rod; and wherein the intermediate portion forms a cylindrical cavity with a larger diameter than the cylindrical body of the metal rod; and wherein the chassis has a pair of vertical grooves; and wherein said grooves are symmetrically apposite; and wherein said grooves are originated with concave borders on the intermediate superior part of the chassis' intermediate portion, and wherein said grooves are vertically extended to the chassis' superior portion; and wherein said grooves have a width that fits the diameter of a metal cable; and wherein the width of said grooves is identical to the width of grooves on the external cylindrical adapter; and wherein the cavity formed by the intermediate portion houses the metal rod in its superior end on contact with the metal cable; and wherein the superior portion has external thread.

In another version of the present invention, the chassis has, in the intermediate inferior part of the chassis' intermediate portion, a pair of symmetrical holes that connect the cavity formed by the intermediate portion with the exterior of the chassis.

In a preferred aspect of the present invention, the external cylindrical adapter fits around the external wall of the intermediate superior part of the chassis' intermediate portion; wherein said adapter has two vertical grooves; and wherein said grooves are symmetrically opposite; and wherein said grooves have a width that fits exactly the diameter of a metal cable, and wherein said grooves have a width that fits the chassis' vertical grooves.

In another version of the present invention, the external cylindrical adapter has two pairs of vertical grooves; wherein each pair of grooves are symmetrically opposite; and wherein each pair of grooves has a width that fits the diameter of metal cables.

In another version of the present invention, the chassis has two pairs of vertical grooves at the level of the superior portion and the intermediate superior part of the intermediate portion; and wherein each part of grooves are symmetrically opposite; and wherein each pair of grooves has a width that fits the diameter of metal cables.

The nut that fits the chassis's superior portion, of the present invention, has a thick wall with an external part and an internal part; wherein the internal part is thicker than the external part; and wherein the wall has an inferior vertical channel between the external part and the internal part; and wherein the wall of the chassis' superior portion fits inside the channel; and wherein the channel's vertical surface which corresponds to the external part of said nut's wall has internal thread; and wherein said internal thread fits the external thread of the chassis' superior portion; and wherein the internal part of said nut's wall is accommodated in the vertical cylindrical cavity of the chassis' superior portion; and wherein the internal part of the nut's wall fills partially the diameter of the vertical cylindrical cavity of the chassis' superior portion; and wherein the internal diameter of said nut defines a vertical cylindrical cavity; and wherein the vertical cylindrical cavity defined by the internal diameter of said nut along the chassis superior portion houses the inferior part of the portable unit.

The portable unit of the present invention has an inferior part and a superior part; wherein the inferior part is housed precisely in the vertical cylindrical cavity defined by the internal diameter of the nut that fits the chassis' superior portion; and wherein said portable unit has between the superior part and the inferior part a metal stopper; and wherein the superior part of said portable unit houses a mixture of metal electrolytic particles and explosive powder; and wherein the mixture of metal electrolytic particles and explosive powder is covered by a layer of detonator; and where the detonator layer is covered by paper; and wherein the paper seals the aperture portable unit's superior part; and wherein the detonator layer is in contact with an ignition fuse that is extended to the exterior of the portable unit's superior part; and wherein the metal of the electrolytic particles has a fusion thermal point lower than the temperature produced by the ignition of the explosive powder; and wherein the metal electrolytic particles are converted in liquid metal due to the high temperature produced by the ignition of the explosive powder; and wherein the liquid metal migrates to the cylindrical cavity of the chassis' intermediate portion; and wherein the liquid metal solidifies into a single welding mass with the superior end of the metal rod and the metal cable; and wherein said welding mass has the external geometry provided by the internal walls of the cylindrical cavity of the chassis' intermediate portion; and wherein the metal stopper has a fusion thermal point lower than the temperature produced by the ignition of the explosive powder housed in the portable unit's superior part; and wherein the wall of the portable unit is made of a material with a fusion thermal point higher than the temperature produced by the ignition of the explosive powder housed in the portable unit's superior part.

In a preferred aspect of the present invention, the portable unit has an aluminum stopper.

In another preferred aspect of the present invention, the portable unit has walls made of ceramic.

In another preferred aspect of the present invention, the chassis is made of a material with a fusion thermal point higher than the temperature produced by the ignition of the explosive powder housed in the portable unit's superior part; and wherein the chassis is made of a material with a fusion thermal point higher or equal than the fusion thermal point of the metal of the electrolytic particles that are housed in the portable unit's superior part.

In another preferred aspect of the present invention, the portable unit houses a mixture of metal electrolytic particles and explosive powder; and wherein the metal of said particles is copper.

Objectives and additional advantages of the present invention will become more evident in the description of the figures, the detailed description of the invention and the claims.

DETAILED DESCRIPTION OF THE INVENTION

Figure 1:
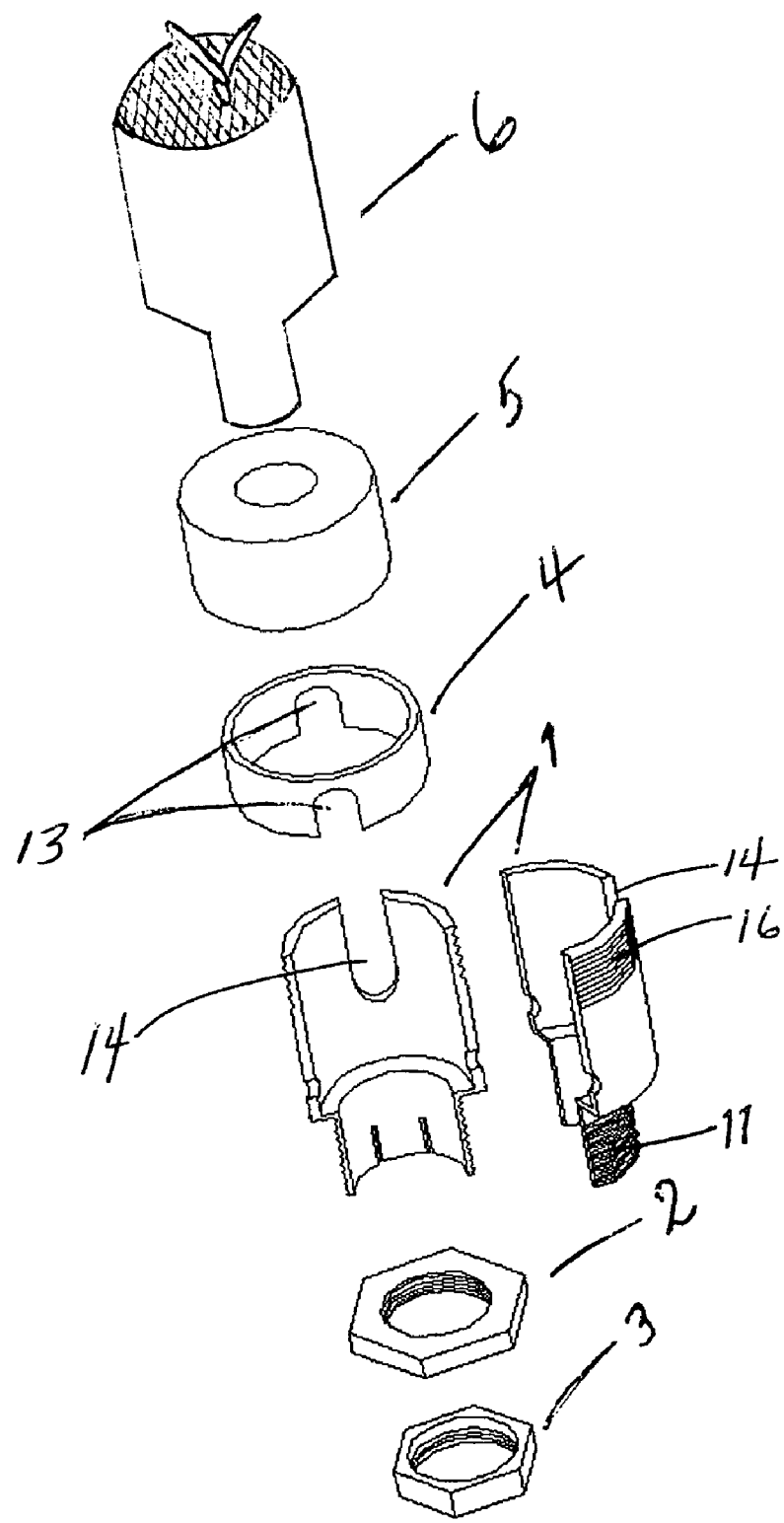
FIG. 1. is a tridimensional view of parts of the endothermic connector device of the present invention.
Figure 5:
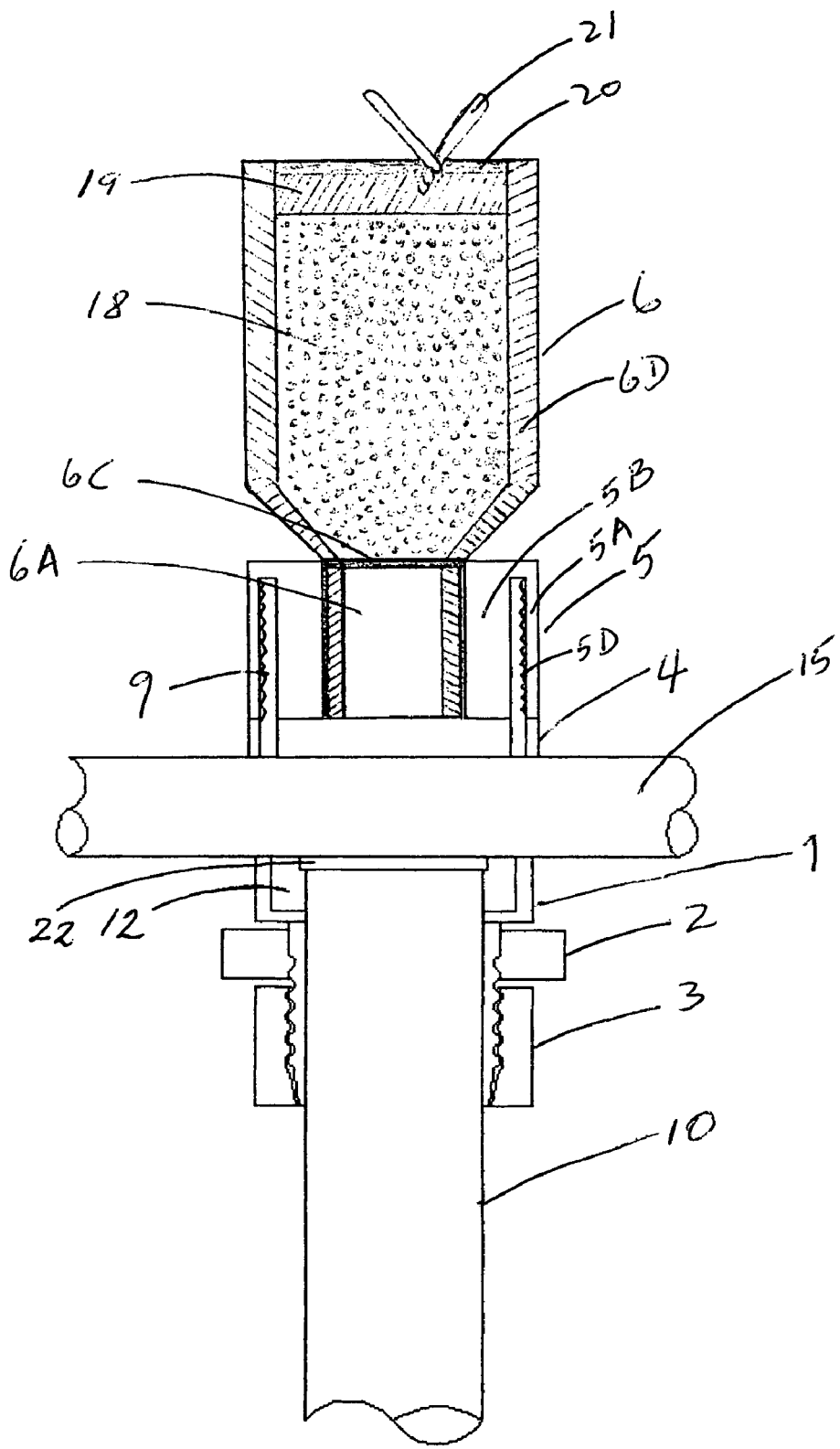
FIG. 5. is a bi-dimensional view of a sagittal plane that cross through the middle of the endothermic connector device of the present invention, which function is to weld a metallic rod and a metallic cable.
Figure 6:
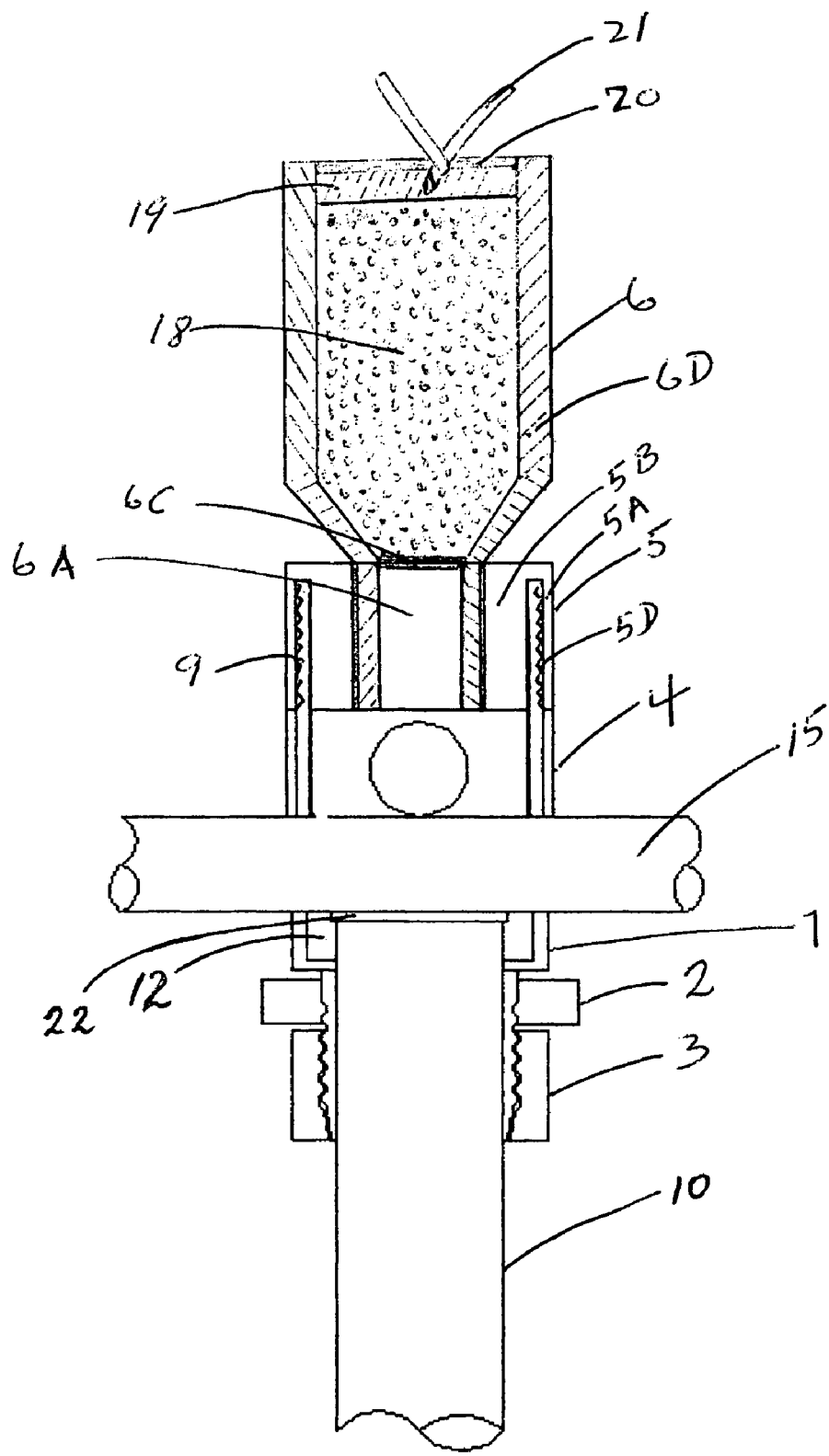
FIG. 6. is a bi-dimensional view of a sagittal plane that cross through the middle of another version of the assembled endothermic connector of the present invention, which function is to weld a metallic rod and two metallic cables.
Figure 7:
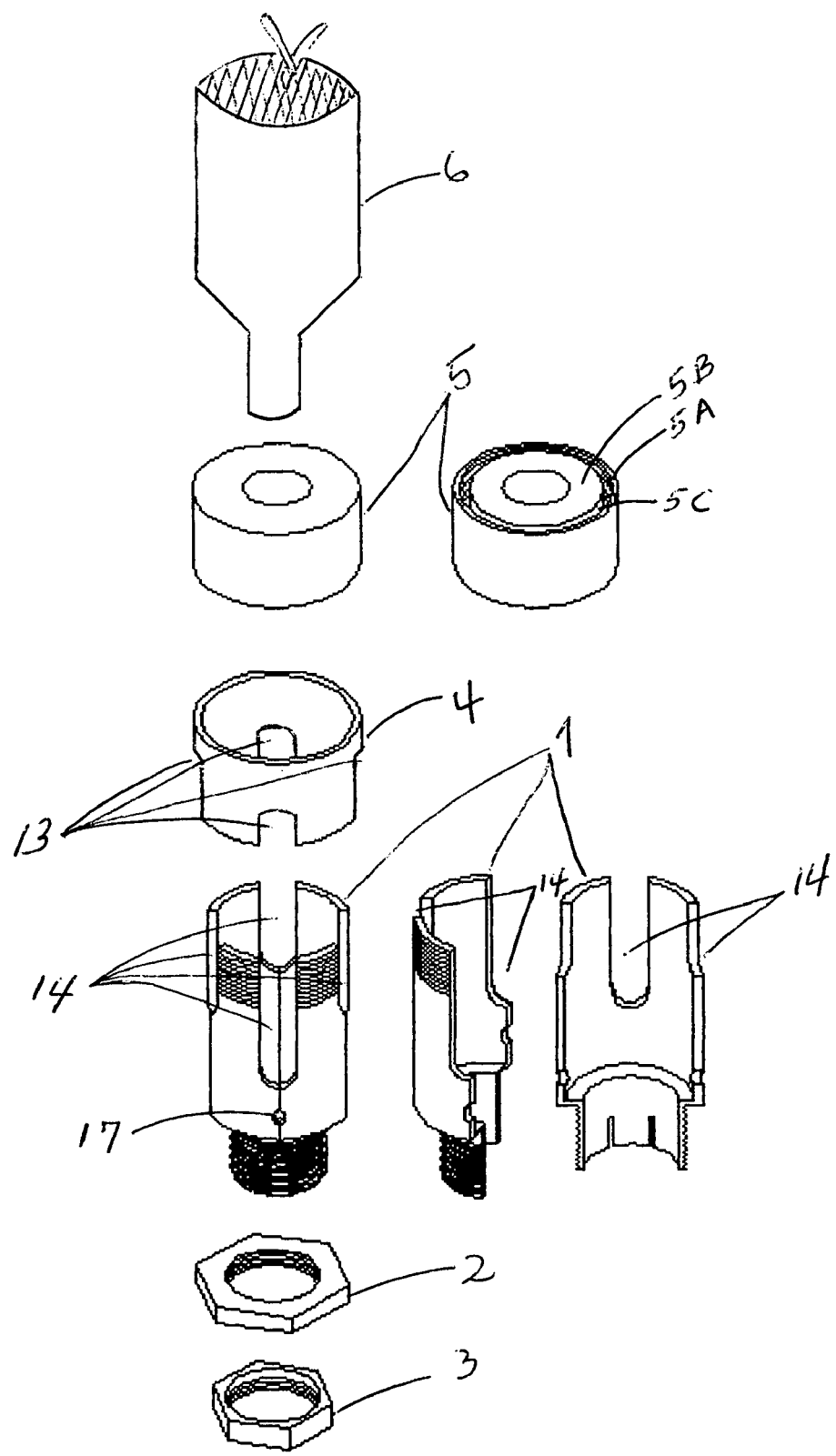
FIG. 7. is a tridimensional view of another version of parts of the device of the present invention, which function is to weld a metallic rod and two metallic cables. In this view it is also observed, the inferior diagonal view of the nut that fits the chassis' superior portion, and a view of the two separated identical halves of the chassis.
Figure 8:
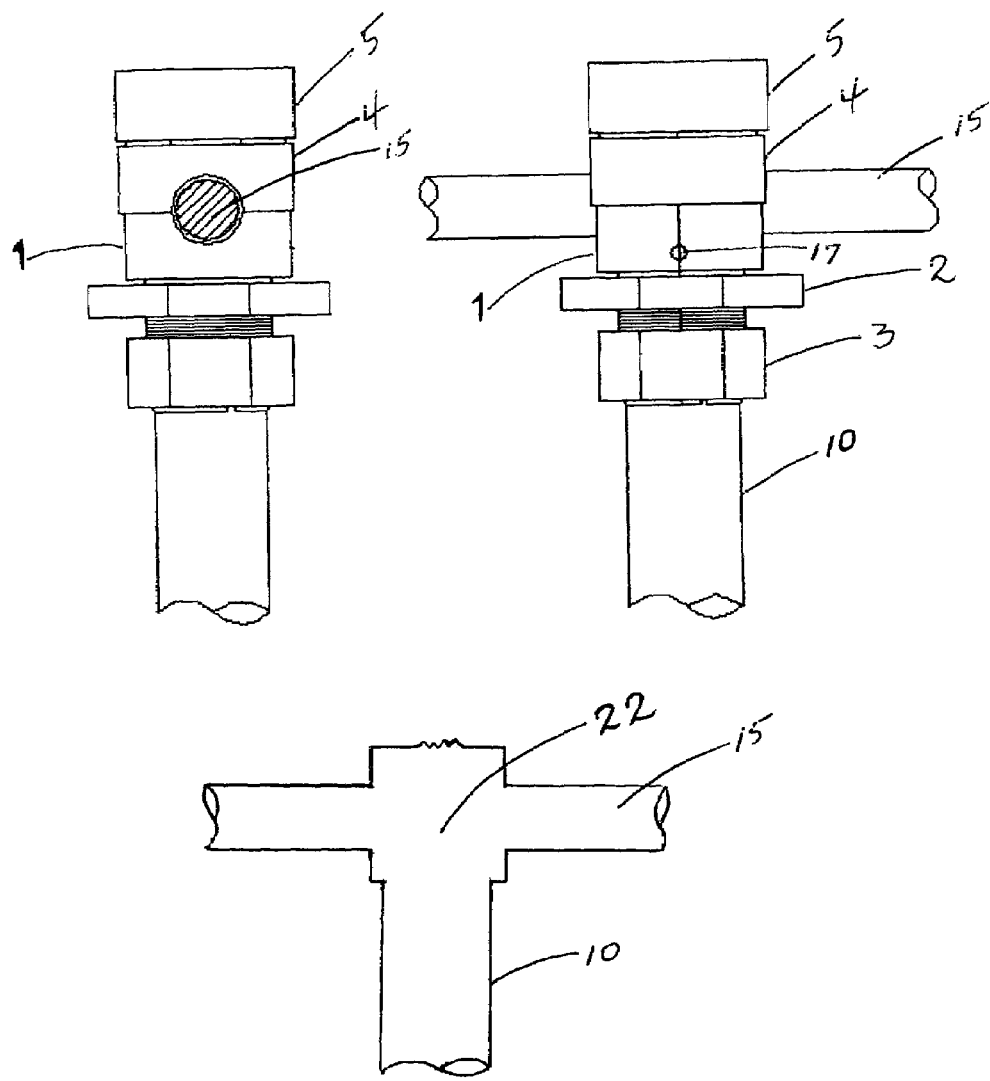
FIG. 8. are bi-dimensional views of the endothermic connector device of the present invention, in which, the frontal and lateral views of the assembled device without the portable unit, and a bi-dimensional frontal representation of the geometric form of the welded mass of the metallic rod and metallic cable, are observed.

In FIG. 1. parts of the endothermic connector device of the present invention can be observed, in the following order:
A. Two identical halves which are joined to form a chassis (1), wherein, as it can be seen in FIG. 2., the chassis has an inferior portion (7), an intermediate portion (8) and a superior portion (9); and wherein the inferior portion (7) has an inferior part (7B) and a superior part (7A); and wherein the intermediate portion (8) has an intermediate inferior part (8B) and an intermediate superior part (8A);
B. an assembling nut (2) that fits externally the chassis's inferior portion (7), at the level of the superior part (7A) of the inferior portion (7); and wherein the assembling nut keeps joined the chassis' two identical halves (1) (FIGS. 5, 6, and 8);
C. A pressure nut (3) that fits the chassis' inferior portion (7), at the level of the inferior part (7B) of the inferior portion; and wherein the pressure nut tightens firmly the chassis (1) over the body of a metal rod (10)(FIGS. 4-6 and 8);
D. An external cylindrical adapter (4)(FIGS. 1, 3-8) that fits externally around the intermediate superior part (8A) of the intermediate portion (8) of the chassis (1);
E. A nut (5)(FIGS. 1, 3-8) that fits the superior portion of the chassis;
F. A portable unit (6)(FIGS. 1, 3-7).

Figure 2:
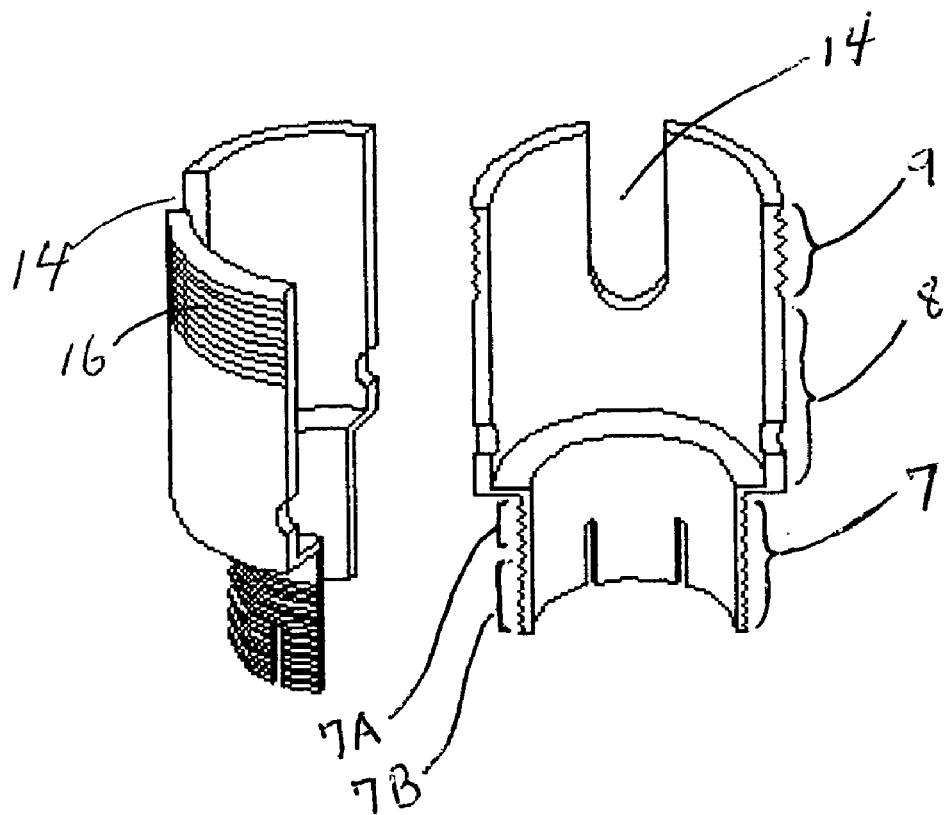
FIG. 2. is a tridimensional view of two separated identical halves and of two assembled halves of the chassis of the present invention.
Figure 2:
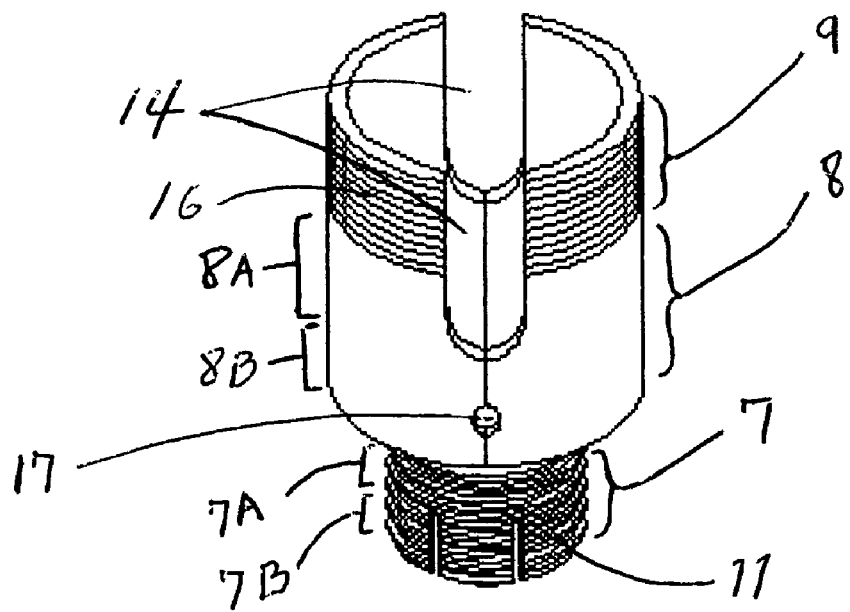
Figure 3:
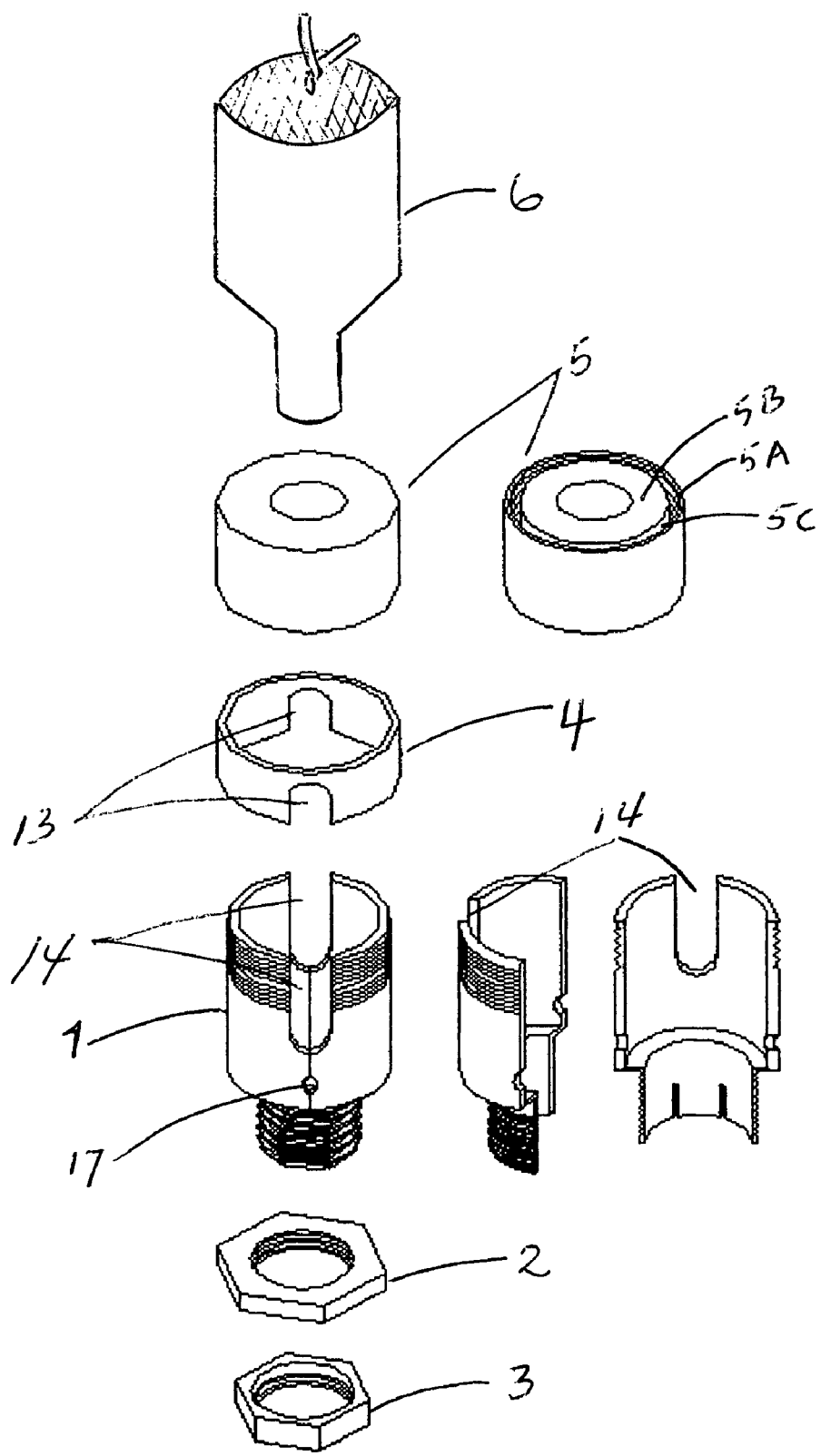
FIG. 3. is another tridimensional view of parts of the endothermic connector device of the present invention, in which an inferior diagonal view of the nut that fits the chassis' superior portion, and a view the two separated identical halves of the chassis are also shown.
Figure 4:
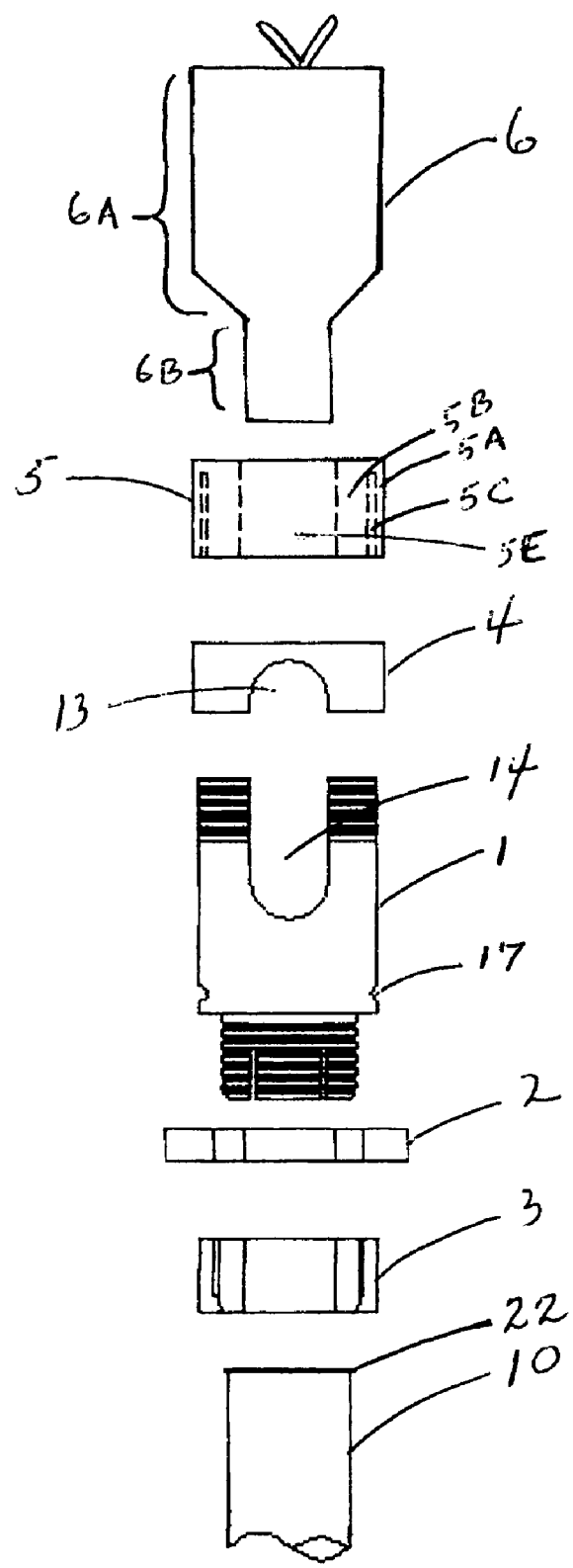
FIG. 4. is a frontal bi-dimensional view of parts of the endothermic device of the present invention.

The chassis (1) of the present invention is preferably an assembling of two identical halves (FIGS. 1-3, 7); wherein the chassis (1) has an inferior portion (7), an intermediate portion (8) and a superior portion (9); and wherein the inferior portion has external thread (11)(FIG. 2); and wherein the inferior portion has an inferior part (7B) and a superior part (7A); and wherein the intermediate portion (8) has an intermediate inferior part (8B) and an intermediate superior part (8A); and wherein the inferior portion (7) forms a cylindrical cavity which diameter fits perfectly the diameter of the cylindrical body of a metal rod (10)(FIGS. 5 and 6); and wherein the intermediate portion (8) forms a cylindrical cavity (12) (FIGS. 5 and 6) with a larger diameter than the cylindrical body of the metal rod (10); and wherein the chassis has a pair of vertical grooves (14)(FIGS. 1-4); and wherein said grooves (14) are symmetrically opposite; and wherein said grooves are originated with concave borders in the intermediate superior part (8A) of the intermediate portion (8) of the chassis (1), and wherein said grooves (14) are vertically extended to the superior portion (9) of the chassis; and wherein said grooves (14) have a width that fits the diameter of a metal cable (15)(FIGS. 5, 6 and 8); and wherein the width of said grooves (14) is identical to the width of the grooves (13)(FIGS. 1, 3 and 4) in the external cylindrical adapter (4); and wherein the cavity (12) formed by the intermediate portion (8) houses the metal rod (10) in its superior end on contact with the metal cable (15); and wherein the superior portion (9) has external thread (16) (FIGS. 1 and 2).

In another version of the present invention, the chassis (1) has, in the intermediate inferior part (8B) of the intermediate portion (8) of the chassis (1), a pair of symmetrical holes (17)(FIG. 2-4, 7 and 8) that connect the cavity (12) formed by the intermediate portion (8) with the exterior of the chassis (1). Said holes (17) are pilots that indicate that the melted metal of the weld has filled the intermediate cavity (12) of the intermediate portion (8) of the chassis (1).

In a preferred aspect of the present invention, the external cylindrical adapter (4) fits around the external wall of the intermediate superior part (8A) of the intermediate portion (8) of the chassis (1); wherein said adapter (4) had two vertical grooves (13)(FIGS. 1, 3 and 4); and wherein said grooves (13) are symmetrically opposite; and wherein said grooves (13) have a width that fits exactly the diameter of a metal cable (15), and wherein said grooves have a width that fits the vertical grooves (14) of the chassis (1).

In another version of the present invention, the external cylindrical adapter (4) has two pairs of vertical grooves (13) (FIG. 7); wherein each pair of grooves (13) are symmetrically opposite; and wherein each pair of grooves (13) has a width that fits the diameter of metal cables (15).

In another version of the present invention, the chassis (1) has two pair of grooves (14)(FIG. 7) at the level of the superior portion (9) and the intermediate superior part (8A) of the intermediate portion (8); and wherein each pair of grooves (14) are symmetrically apposite; and wherein each pair of grooves (14) has a width that fits the diameter of metal cables (15).

The nut (5)(FIGS. 1, 3-8) that fits the chassis' superior portion (9), of the present invention, has a thick wall with an external part (5A)(FIG. 3-7) and an internal part (5B)(FIGS. 3-7); and wherein the internal part (5B) is thicker than the external part (5A); and wherein the wall has a vertical inferior channel (5C)(FIGS. 3, 4 and 7) between the external part (5A) and the internal part (5B); and wherein the wall of the superior portion (9)(FIGS. 5 and 6) of the chassis (1) fits inside the channel (5C); and wherein the vertical surface of the channel (5C) which corresponds to the external part (5A) of the wall of said nut (5) has internal thread (5D) (FIGS. 5 and 6); and wherein said internal thread (5D) fits the external thread (16) (FIG. 1) of the superior portion (9) of the chassis (1); and wherein the internal part (5B) of the wall of said nut (1) is accommodated in the vertical cylindrical cavity of the superior portion (9) of the chassis (1); and wherein the internal part (5B) of the wall of the nut (5) fills partially the diameter of the vertical cylindrical cavity of the superior portion (9) of the chassis (1); and wherein the internal diameter of said nut (5) defines a vertical cylindrical cavity (5E) (FIG. 4); and wherein the vertical cylindrical cavity (5E) defined by the internal diameter of said nut (5) along the superior portion (9) of the chassis (1) houses the inferior part (6B) of the portable unit (6) (FIGS. 5 and 6).

The portable unit (6) of the present invention has an inferior part (6B) (FIG. 4) and a superior part (6A) (FIG. 4); wherein the inferior part (6B) is housed precisely in the vertical cylindrical cavity (5E) (FIG. 4) defined by the internal diameter of the nut (5) that fits the superior portion (9) of the chassis (1); wherein said portable unit (6) has between the superior part (6A) and the inferior part (6B) a metal stopper (6C) (FIGS. 5 and 6); and wherein the superior part (6A) of said portable unit (6) houses a mixture of electrolytic particles of metal and explosive powder (18)(FIGS. 5 and 6); and wherein the mixture of electrolytic particles of metal and explosive powder (18) is covered by a layer of detonator (19)(FIGS. 5 and 6); and wherein the detonator layer (19) is covered by paper (20)(FIGS. 5 and 6); and wherein the paper (20) seals the aperture of the superior part (6A) of the portable unit (6); and wherein the detonator layer (19) is in contact with an ignition fuse (21)(FIGS. 5 and 6) that is extended to the exterior of the superior part (6A) of the portable unit (6); and wherein the metal of the electrolytic particles has a fusion thermal point lower than the temperature produced by the ignition of the explosive powder; and wherein the metal electrolytic particles are converted in liquid metal due to the high temperature produced by the ignition of the explosive powder; and wherein the liquid metal migrates to the cylindrical cavity (12) (FIGS. 5 and 6) of the intermediate portion (8) of the chassis (1); and wherein the liquid metal solidifies into a single welding mass (22) (FIG. 8) with the superior end of the metal rod (10) and the metal cable (15); and wherein said welding mass (22) has the external geometry provided by the internal walls of the cylindrical cavity (12) of the intermediate portion (8) of the chassis (1); and wherein the metal stopper (6C) has a fusion thermal point lower than the temperature produced by the ignition of the explosive powder housed in the superior part of the portable unit (6); and wherein the wall (6D) (FIGS. 5 and 6) of the portable unit (6) is made of a material with a fusion thermal point higher than the temperature produced by the ignition of the explosive powder housed in the superior part (6A) of the portable unit (6).

In a preferred aspect of the present invention, the portable unit (6) has a stopper (6C) of aluminum.

In another preferred aspect of the present invention, the portable unit (6) has walls made of ceramic (6D).

In another preferred aspect of the present invention, the chassis (1) is made of a material with a fusion thermal point higher than the temperature produced by the ignition of the explosive powder housed in the superior part (6A) of the portable unit (6); and wherein the chassis (1) is made of a material with a fusion thermal point higher than or equal to the fusion thermal point of the metal of the electrolytic particles that are housed in the superior part (6A) of the portable unit (6).

In a preferred aspect of the present invention, the portable unit (6) houses a mixture of electrolytic particles of metal and explosive powder (18); and wherein the metal of said electrolytic particles is copper. As a consequence, the welding mass (22) of copper of the metal rod (10) and the metal cable (15) is resistant to corrosion and with low electrical resistance.

In a preferred aspect of the present invention, the chassis (1) is made of steel. Although the chassis (1) of steel would wear out by corrosion with time, steel has a fusion thermal point higher than the copper, the preferred material for the weld.

Steel also has a fusion thermal point higher than the temperature produced by the ignition of the explosive powder in the portable unit (6).

Another advantage of the chassis (1) made of steel, is the low cost of steel when compared to other metals that could also be used to build the chassis (1), as for example, brass or copper. The corrosion of steel with time does not affect the welding mass (22), which would be of copper, the preferred material for the weld of ground rods and metallic cables.

The endothermic connector device of the present invention is appropriate to weld metal elements used in earthing systems, e.g., copper rods and copper cables, the metallic elements more used in such systems.

One of the advantages of the present invention is that the two identical halves that form the chassis can be assembled around the rods (10) of copper with lips (22) (FIG. 4-6) at the end. Such lips (22) are formed when the rod (10) of copper is buried in the ground with hammer strikes While the description presents the preferred embodiments of the present invention, additional changes can be made in the form and disposition of the parts without distancing from the basic ideas and principles comprised in the following claims:

The invention claimed is:

1. An endothermic connector device to weld metal elements, wherein said device comprises:
    two identical halves which are joined to form a chassis, wherein the chassis has an inferior portion, an intermediate portion and a superior portion; and wherein the inferior portion has an inferior part and a superior part; and wherein the intermediate portion has an intermediate inferior part and an intermediate superior part;
    an assembling nut that fits externally the inferior portion of the chassis, at the level of the superior part of the inferior portion; and wherein the assembling nut keeps joined the two identical halves of the chassis;
    a pressure nut that fits the chassis' inferior portion, at the level of the inferior part of the inferior portion; and wherein the pressure nut tightens firmly the chassis over the body of a metal rod;
    an external cylindrical adapter that fits externally around the intermediate superior part of the chassis' intermediate portion;
    a nut that fits the superior portion of the chassis; a portable unit.

2. The endothermic connector device, according to claim 1, wherein said device comprises an assembling and pressure nut that fits exactly to the inferior portion of the chassis.

3. The endothermic connector device, according to claim 1, wherein said device comprises a chassis that is assembled from two identical halves, wherein the chassis has an inferior portion, an intermediate portion and a superior portion; and wherein the inferior portion has external thread; and wherein the inferior portion has an inferior part and a superior part; and wherein the intermediate portion has an intermediate inferior part and an intermediate superior part; and wherein the inferior portion forms a cylindrical cavity which diameter fits perfectly the diameter of the cylindrical body of a metal rod; and wherein the intermediate portion forms a cylindrical cavity with a larger diameter than the cylindrical body of the metal rod; and wherein the chassis has a pair of vertical grooves; and wherein said grooves are symmetrically apposite; and wherein said grooves are originated with concave borders on the intermediate superior part of the chassis' intermediate portion, and wherein said grooves are vertically extended to the superior portion of the chassis; and wherein said grooves have a width that fits the diameter of a metal cable; and wherein the width of said grooves is identical to the width of grooves on the external cylindrical adapter; and wherein the cavity formed by the intermediate portion houses the metal rod in its superior end on contact with the metal cable; and wherein the superior portion has external thread.

4. The endothermic connector device, according to claim 3, wherein said device comprises a chassis, wherein the chassis has, in the intermediate inferior part of the chassis' intermediate portion, a pair of symmetrical holes that connect the cavity formed by the intermediate portion with the exterior of the chassis.

5. The endothermic connector device, according to claim 3, wherein said device comprises an external cylindrical adapter, that fits around the external wall of the intermediate superior part of the chassis' intermediate portion; wherein said cylindrical adapter has two vertical grooves; and wherein said grooves are symmetrically opposite; and wherein said grooves have a width that fits exactly the diameter of a metal cable, and wherein said grooves have a width that fits the chassis' vertical grooves.

6. The endothermic connector device, according to claim 3, wherein said device comprises an external cylindrical adapter that fits around the external wall of the intermediate superior part of the chassis' intermediate portion; and wherein the external cylindrical adapter has two pairs of vertical grooves; wherein each pair of grooves are symmetrically opposite; and wherein each pair of grooves has a width that fits the diameter of metal cables.

7. The endothermic connector device, according to claim 3, wherein said device comprises a chassis with two pairs of vertical grooves at the level of the superior portion and the intermediate superior part of the intermediate portion; wherein each pair of grooves are symmetrically opposite; and wherein each pair of grooves has a width that fits the diameter of metal cables.

8. The endothermic connector device, according to claim 3, wherein said device comprises a nut that fits the chassis's superior portion, wherein the nut has a thick wall with an external part and an internal part; wherein the internal part is thicker than the external part; and wherein the wall has an inferior vertical channel between the external part and the internal part; and wherein the wall of the chassis' superior portion fits inside the channel; and wherein the channel's vertical surface which corresponds to the external part of the wall of said nut has internal thread; and wherein said internal thread fits the external thread of the chassis' superior portion; and wherein the internal part of the wall of said nut is accommodated in the vertical cylindrical cavity of the chassis' superior portion; and wherein the internal part of the wall of the nut fills partially the diameter of a vertical cylindrical cavity of the chassis' superior portion; and wherein the internal diameter of said nut defines a vertical cylindrical cavity; and wherein the vertical cylindrical cavity defined by the internal diameter of said nut along the chassis superior portion houses the inferior part of the portable unit.

9. The endothermic connector device, according to claim 8, wherein said device comprises a portable unit that has an inferior part and a superior part; wherein the inferior part is housed precisely in the vertical cylindrical cavity defined by the internal diameter of the nut that fits the chassis' superior portion; and wherein said portable unit has between the superior part and the inferior part a metal stopper; and wherein the superior part of said portable unit houses a mixture of metal electrolytic particles and explosive powder; and wherein the mixture of metal electrolytic particles and explosive powder is covered by a layer of detonator; and where the detonator layer is covered by paper; and wherein the paper seals the aperture of the superior part of the portable unit; and wherein the detonator layer is in contact with an ignition fuse that is extended to the exterior of the portable unit's superior part; and wherein the metal of the electrolytic particles has a fusion thermal point lower than the temperature produced by the ignition of the explosive powder; and wherein the metal electrolytic particles are converted in liquid metal due to the high temperature produced by the ignition of the explosive powder; and wherein the liquid metal migrates to the cylindrical cavity of the chassis' intermediate portion; and wherein the liquid metal solidifies into a single welding mass with the superior end of the metal rod and the metal cable; and wherein said welding mass has the external geometry provided by the internal walls of the cylindrical cavity of the chassis' intermediate portion;

and wherein the metal stopper has a fusion thermal point lower than the temperature produced by the ignition of the explosive powder housed in the portable unit's superior part; and wherein the wall of the portable unit is made of a material with a fusion thermal point higher than the temperature produced by the ignition of the explosive powder housed in the portable unit's superior part.

10. The endothermic connector device, according to claim 9, wherein said device comprises a portable unit that has an inferior part and a superior part, wherein said portable unit has between the superior part and the inferior part a metal stopper; and wherein the metal of said stopper is aluminum.

11. The endothermic connector device, according to claim 9, wherein said device comprises a portable unit with walls made of ceramic.

12. The endothermic connector device, according to claim 9, wherein said device comprises a chassis made of a material with a fusion thermal point higher than the temperature produced by the ignition of the explosive powder housed in the superior part of the portable unit; and wherein the chassis is made of a material with a fusion thermal point higher than the fusion thermal point of the metal of the electrolytic particles that are housed in the superior part of the portable unit.

13. The endothermic connector device, according to claim 9, wherein said device comprises a chassis made of a material with a fusion thermal point higher than the temperature produced by the ignition of the explosive powder housed in the superior part of the portable unit; and wherein the chassis is made of a material with a fusion thermal point equal to the fusion thermal point of the metal of the electrolytic particles that are housed in the superior part of the portable unit.

14. The endothermic connector device, according to claim 9, wherein said device comprises a portable unit with an inferior part and a superior part; wherein the superior part houses a mixture of electrolytic metal particles and explosive powder; and wherein the metal of said electrolytic particles is copper.

* * * * *